US010859491B2

(12) United States Patent
Hazama et al.

(10) Patent No.: US 10,859,491 B2
(45) Date of Patent: Dec. 8, 2020

(54) SPECTROSCOPIC ANALYSIS APPARATUS

(71) Applicant: Yokogawa Electric Corporation, Musashino (JP)

(72) Inventors: Kentaro Hazama, Tokyo (JP); Junichi Matsuo, Tokyo (JP); Nobuko Takekawa, Tokyo (JP); Yuya Sugiyama, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 3 days.

(21) Appl. No.: 16/275,948

(22) Filed: Feb. 14, 2019

(65) Prior Publication Data

US 2019/0257749 A1 Aug. 22, 2019

(30) Foreign Application Priority Data

Feb. 16, 2018 (JP) .................................. 2018-026349

(51) Int. Cl.
*G01N 21/39* (2006.01)
*G01J 3/06* (2006.01)
(Continued)

(52) U.S. Cl.
CPC .............. *G01N 21/39* (2013.01); *G01J 3/027* (2013.01); *G01J 3/06* (2013.01); *G01J 3/433* (2013.01);
(Continued)

(58) Field of Classification Search
CPC ... G01N 2021/8521; G01N 2021/8578; G01N 21/3504; G01N 21/39; G01N 21/8507;
(Continued)

(56) References Cited

U.S. PATENT DOCUMENTS

2014/0170760 A1* 6/2014 Tanabe ................. G01N 21/645
436/94
2015/0211928 A1* 7/2015 Itoh ........................ G01J 3/10
356/369

(Continued)

FOREIGN PATENT DOCUMENTS

JP 2010-185694 A 8/2010

OTHER PUBLICATIONS

Sappey, Andrew D. et al., "Flight-Ready TDLAS Combustion Sensor for the HIFiRE 2 Hypersonic Research Program", Arnold Engineering Development Center Arnold Air Force Base, Tennessee Air Force Materiel Command United States Air Force, Sep. 1, 2009 (52 pages); Cited in EP Search Report dated Jun. 26, 2019.

*Primary Examiner* — Tri T Ton
(74) *Attorney, Agent, or Firm* — Westerman, Hattori, Daniels & Adrian, LLP

(57) ABSTRACT

A spectroscopic analysis apparatus includes a laser light source that emits laser light, of which wavelength changes, toward a reflector inside a probe, the probe being configured to be disposed in a flow passage of a measurement target fluid, a light receiver that receives the laser light reflected by the reflector, and a controller that analyzes the measurement target fluid using a result of reception acquired by the light receiver and controlling the laser light source. The controller controls the laser light source to perform at least one scan of the laser light, the controller controlling the laser light source such that a scanning time of the laser light is equal to or shorter than a light-receivable time of the laser, the scanning time being a time to scan the laser light emitted from the laser light source in a certain wavelength range, the light-receivable time being a time in which the laser light reflected by the reflector can be received by the light receiver.

19 Claims, 12 Drawing Sheets

(51) Int. Cl.
  *H01S 3/08* (2006.01)
  *G01N 21/85* (2006.01)
  *G01J 3/02* (2006.01)
  *G01J 3/433* (2006.01)
  *G01N 21/3504* (2014.01)

(52) U.S. Cl.
  CPC ..... *G01N 21/8507* (2013.01); *H01S 3/08086* (2013.01); *G01J 2003/4334* (2013.01); *G01N 21/3504* (2013.01); *G01N 2021/8521* (2013.01); *G01N 2021/8578* (2013.01)

(58) Field of Classification Search
  CPC ...... G01J 2003/4334; G01J 3/027; G01J 3/06; G01J 3/433; G01J 3/4338; H01S 3/08086
  USPC .................................................. 356/432–448
  See application file for complete search history.

(56) References Cited

U.S. PATENT DOCUMENTS

| | | | |
|---|---|---|---|
| 2015/0346479 A1* | 12/2015 | Hirokubo | G01J 3/26 359/578 |
| 2017/0205336 A1 | 7/2017 | Ido | |
| 2017/0212042 A1 | 7/2017 | Angelosante et al. | |
| 2018/0113025 A1* | 4/2018 | Morales Rodriguez | G01N 21/3504 |

* cited by examiner

SPECTROSCOPIC ANALYSIS APPARATUS

CROSS REFERENCE TO RELATED APPLICATION

The present application claims priority based on Japanese patent application 2018-026349, filed on Feb. 16, 2018 and the contents of which are incorporated herein by reference.

BACKGROUND

Technical Field

The present invention relates to a spectroscopic analysis apparatus.

Related Art

Conventionally, as a device measuring the density of a measurement target component, a laser gas analyzer of a tunable diode laser absorption spectroscopy (TDLAS) type is known (for example, see Japanese Unexamined Patent Application, First Publication No. 2010-185694). The laser gas analyzer of the TDLAS type, for example, is mounted on a furnace wall of a flue and measures the density of a measurement target component inside the flue. More specifically, the laser gas analyzer of the TDLAS type includes a laser light source that is inserted into a flow passage of a process gas inside a flue and emits laser light, a light receiver that receives laser light, and a probe that includes a reflector reflecting laser light emitted into a process gas to reciprocate. Then, the laser gas analyzer of the TDLAS type reflects laser light emitted from the laser light source on the reflector, measures the intensity of laser light that has passed through the process gas using the light receiver, and directly measures a component density of a measurement target on the basis of the measured intensity.

Many gas molecules such as CO, $CO_2$, $H_2O$, $C_nH_m$, $NH_3$, and $O_2$ have a light absorption spectrum based on vibration-rotational energy transitions of molecules in a region of infrared light to near-infrared light. In an absorption spectrum, component molecules are unique, and absorbance is in proportion to a component density and the length of an optical path (Lambert Beer's law), and accordingly, the density of a target component can be measured by measuring the intensity of the absorption spectrum.

The laser gas analyzer of the TDLAS type transmits semiconductor laser light having a line width that is much narrower than a gas absorption line width through a measurement gas and modulates a drive current thereof at a high speed to scan the wavelength and measures the amount of transmitted light to measure one independent absorption spectrum. The scanning range of laser light differs in accordance with an application. For example, in the case of an $O_2$ meter, a line width of laser light is about 0.0002 nm, and a scanning width thereof is about 0.1 to 0.2 nm. The laser gas analyzer of the TDLAS type measures an absorption spectrum by scanning the width of 0.1 to 0.2 nm. Then, the laser gas analyzer of the TDLAS type calculates a component density of the measurement target component by executing density conversion from the one absorption spectrum that has been measured.

However, the gas density measuring device or the laser gas analyzer of the TDLAS type disclosed in Patent Document 1 is installed on the wall of the flue. For this reason, when there is a normal vibration in an installation environment or a vibration generated in accordance with a temporary external disturbance, a gas density measuring device and a laser gas analyzer such as a laser gas analyzer of the TDLAS type are influenced by the vibration. For example, there are cases in which a wall of a flue on which a laser gas analyzer is mounted vibrates in accordance with an operation of a device such as a motor or a fan that is present in the vicinity of the flue.

In the case of a normal vibration, the laser gas analyzer also vibrates only with the wall of the flue, and accordingly, the influence on the measurement is small. However, when the frequency of a vibration source of the wall of the flue (a device such as a motor or a fan) coincides with or is close to a natural frequency fn of a part from a portion of a probe fixed to the wall of the flue to a tip end, the probe resonates using the side of the wall of the flue as a fixed end and violently vibrates.

FIG. 12 is a diagram illustrating an appearance of a probe at the time of resonance. As illustrated in FIG. 12, when the probe 100 resonates, a relative position between a laser light source 110 and a light receiver 120 and a reflector 130 mounted at a front end of a probe changes, and even when the laser light source 110 emits laser light, reflected laser light deviates from a light receiving face of the light receiver 120 (or is not returned). As a result, a scanning signal required for an analysis may not be acquired. For this reason, the laser gas analyzer cannot collect data required for measurement of a density of a gas. As a result, with a conventional laser gas analyzer, the density of the gas cannot be measured. In addition, such issue is not limited to a laser gas analyzer that measures the density of a gas but is an issue that similarly occurs also in a device analyzing the light absorption characteristics of a fluid.

SUMMARY

A spectroscopic analysis apparatus includes a laser light source that emits laser light, of which wavelength changes, toward a reflector inside a probe, the probe being configured to be disposed in a flow passage of a measurement target fluid, a light receiver that receives the laser light reflected by the reflector, and a controller that analyzes the measurement target fluid using a result of reception acquired by the light receiver, the controller being configured to control the laser light source, wherein the controller controls the laser light source to perform at least one scan of the laser light, the controller controlling the laser light source such that a scanning time of the laser light is equal to or shorter than a light-receivable time of the laser, the scanning time being a time to scan the laser light emitted from the laser light source in a certain wavelength range, the light-receivable time being a time in which the laser light reflected by the reflector can be received by the light receiver.

Further features and aspects of the present invention will become apparent from the detailed description of the embodiments described below with reference to the accompanying drawings.

DETAILED DESCRIPTION OF THE INVENTION

Hereinafter, several embodiments of the present invention will be described with reference to drawings.

First Embodiment

Figure 1:
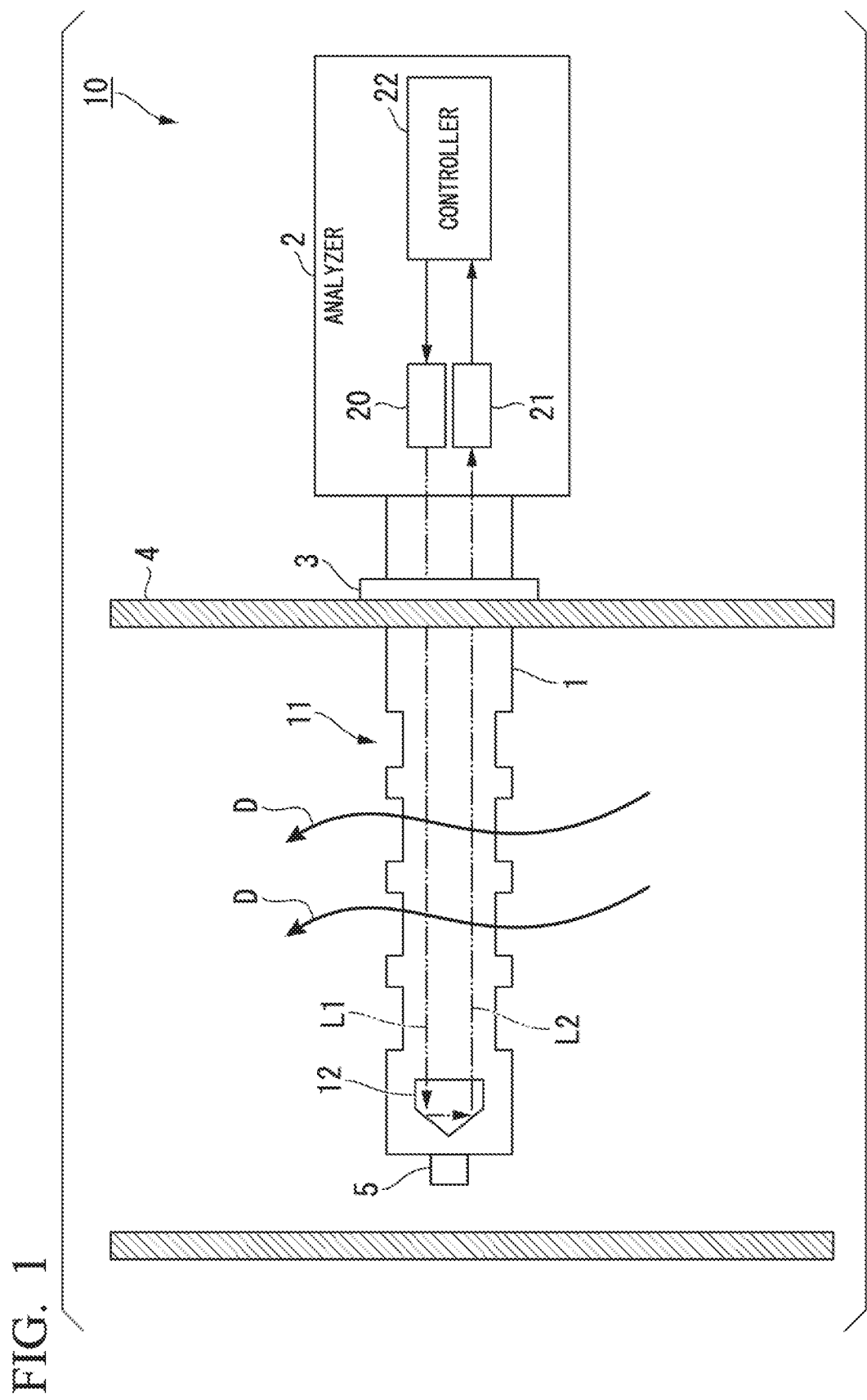
FIG. 1 is diagram illustrating the configuration of a gas density measuring device according to a first embodiment.

FIG. 1 is diagram illustrating the configuration of a gas density measuring device 10 according to a first embodiment. The gas density measuring device 10 measures a density of a target component included in a measurement gas flowing inside a flue. The target component, for example, is oxygen ($O_2$), carbon monoxide (CO), methane ($CH_4$), ammonia ($NH_3$), carbon dioxide ($CO_2$), hydro carbon ($C_nH_m$), water vapor ($H_2O$), or a gas having absorbency in a near-infrared region. The gas density measuring device 10 is one type of spectroscopic analysis apparatus.

The gas density measuring device 10 includes a probe unit 1 and an analyzer 2.

The probe unit 1, for example, is made of metal and configured as a cylindrical object having a circular cross-section. The length of the probe unit 1 is, for example, about 1 to 2 m. The probe unit 1 is mounted on the wall 4 of the flue through a flange 3 such that most thereof is positioned inside the flue. A plurality of opening portions 11 are disposed in the probe unit 1, and are configured such that a measurement gas flowing inside the flue circulates inside of the probe unit 1. In FIG. 1, the measurement gas flows from the lower side to the upper side, i.e., in the direction of D.

A reflector 12 is disposed inside a distal end of the probe unit 1. The reflector 12 is, for example, a polyhedron such as a corner-cube prism. The inside of the distal end of the probe unit 1 is filled with a purge gas. An acceleration sensor 5 is mounted outside the distal end of the probe unit 1. The acceleration sensor 5 detects an acceleration of the vibration of the probe unit 1.

The analyzer 2 is mounted at an end portion of the probe unit 1 on a side opposite to an end portion at which the reflector 12 is disposed and is positioned outside the flue. The analyzer 2 includes a laser light source 20, a light receiver 21, and a controller 22.

The laser light source 20 emits laser light of which wavelength changes toward the reflector 12 of the probe unit 1 in accordance with control of the controller 22. In other words, the laser light source 20 executes wavelength scanning under the control of the controller 22. For example, the laser light source 20 emits laser light of which wavelength continuously changes from a wavelength w1 to a wavelength w2 such that a wavelength of an absorption peak for which an absorption spectrum is acquired is interposed therebetween. In this example, the range of one-wavelength scanning is a range from the wavelength w1 to the wavelength w2. The laser light source 20 is a variable-wavelength laser. In FIG. 1, laser light L1 emitted by the laser light source 20 is illustrated. The laser light L1 passes through the inside of the probe unit 1 and is reflected by the reflector 12. Returning light reflected by the reflector 12 passes through the inside of the probe unit 1 again and is received by the light receiver 21. In FIG. 1, returning light L2 that has been reflected is illustrated.

When passing through the inside of the probe unit 1, the laser light L1 and the laser light L2 is absorbed by a measurement gas circulating inside the probe unit 1. By measuring this absorption spectrum, the gas density measuring device 10 acquires a density of a measurement target component contained in the measurement gas.

Figure 2:
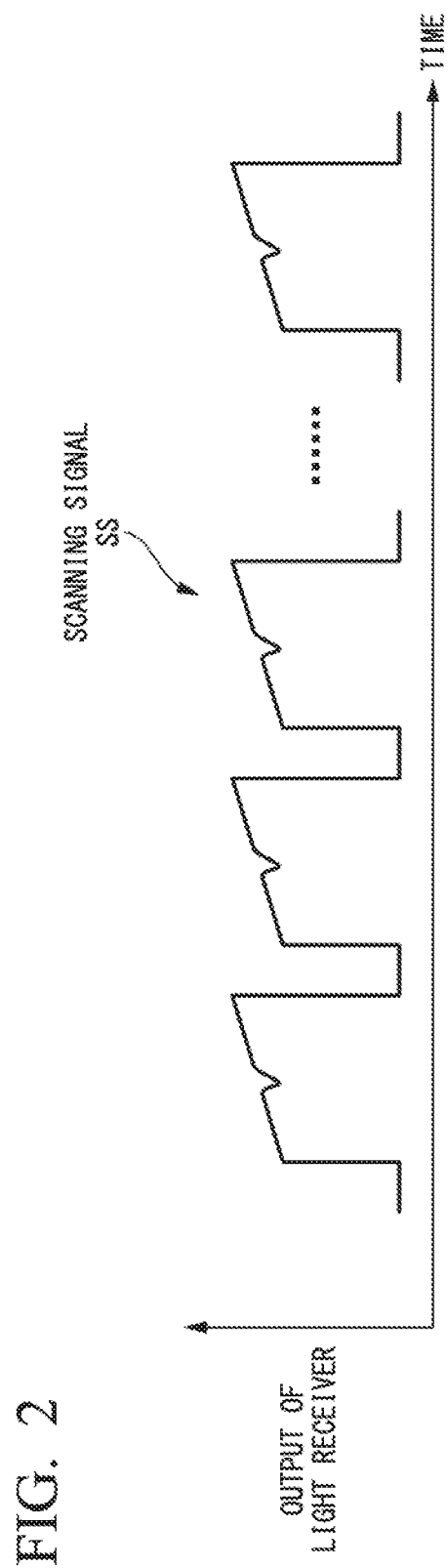
FIG. 2 is a diagram illustrating an output image of a light receiver.

The light receiver 21 receives the laser light L2 (the returning light) and outputs an optical intensity of the laser light L2 to the controller 22 as a series of scanning signals SS. The scanning signals SS become a waveform of which an intensity changes in accordance with a timing of the wavelength scanning of a drive current of the laser light source 20. Here, since the laser light L2 is absorbed by the measurement gas, as illustrated in FIG. 2, a decrease in the intensity based on the light absorption occurs in some of the scanning signals SS. FIG. 2 is a diagram illustrating an output image of the light receiver 21.

The controller 22 executes an analysis of a measurement target fluid using a result of reception acquired by the light receiver 21 and control of the laser light source 20 using a result of detection acquired by the acceleration sensor 5. More specifically, the controller 22 calculates a light-receivable time in which the laser light L2 reflected by the reflector 12 can be received by the light receiver 21 using the result of detection acquired by the acceleration sensor 5 and executes control of a laser light output of the laser light source 20 such that a scanning time Ts is equal to or shorter than half the light-receivable time. The analysis of a measurement target fluid, for example, is calculation of a density of a measurement target component contained in the measurement gas. The scanning time Ts is a time it takes to scan a light emission wavelength of the laser light L1 emitted from the laser light source 20 over a wavelength range (from the wavelength w1 to the wavelength w2) having a wavelength of an absorption peak for which an absorption spectrum of a measurement gas is acquired interposed therein.

Figure 3:
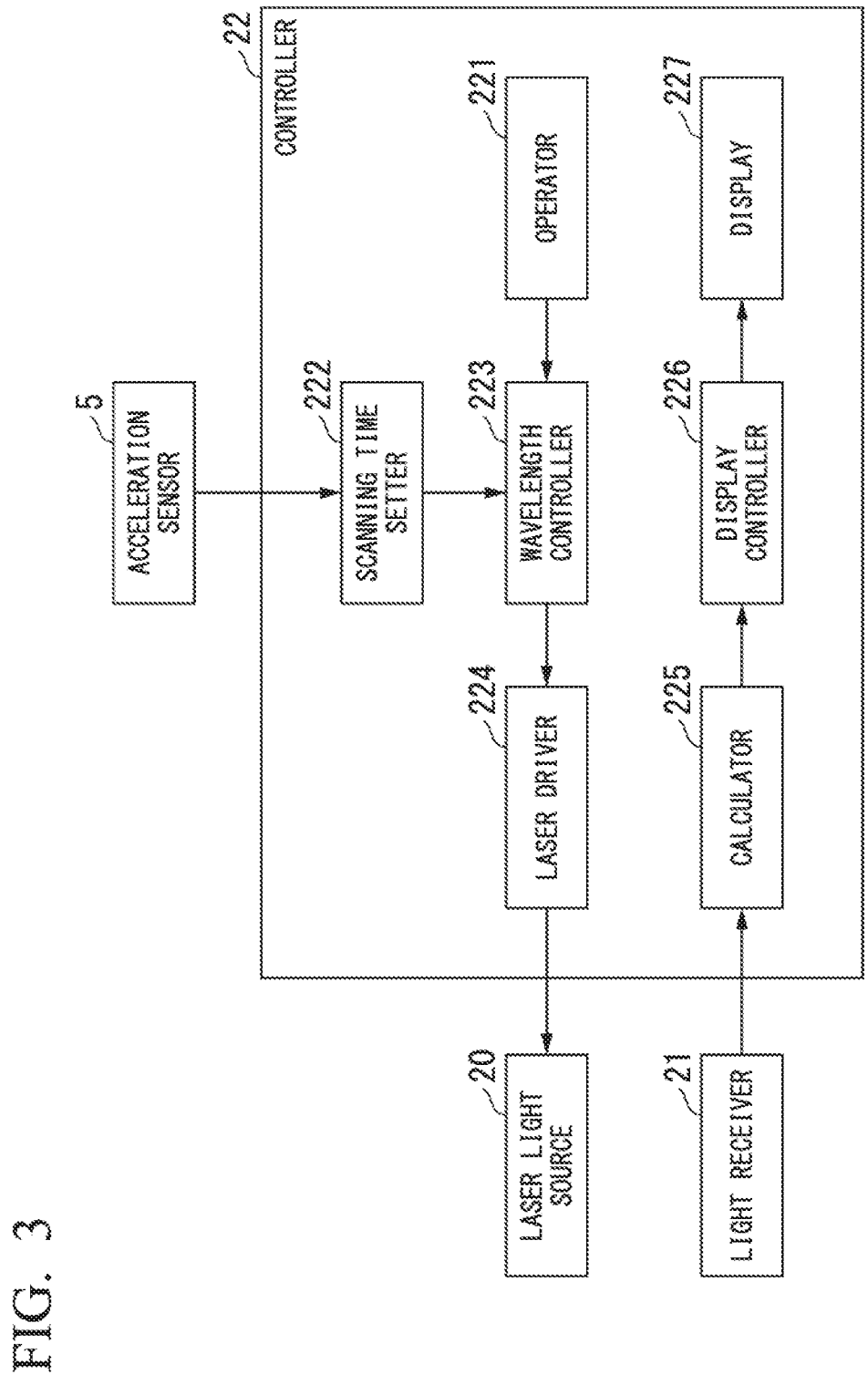
FIG. 3 is a block diagram illustrating the configuration of a controller according to the first embodiment.

FIG. 3 is a block diagram illustrating the configuration of the controller 22 according to the first embodiment. The controller 22 includes an operation unit 221, a scanning time setter 222, a wavelength controller 223, a laser driver 224, a calculator 225, a display controller 226, and a display 227.

The operation unit 221 receives inputs of various settings (for example, a measurement gas type, a density range, and the like) of the gas density measuring device 10, a measurement start instruction, and a measurement end instruction from a user.

The scanning time setter 222 determines a scanning time Ts on the basis of an acceleration acquired from the acceleration sensor 5. More specifically, first, the scanning time setter 222 calculates a vibration amplitude a of the probe unit 1 using the acceleration acquired from the acceleration sensor 5. Next, the scanning time setter 222 calculates a period Td in which the light receiver 21 can acquire a scanning signal SS when the probe unit 1 resonates. More specifically, the scanning time setter 222 calculates a light-receivable time on the basis of a natural vibration number fn of the probe unit 1 (a vibration frequency of the probe), the calculated vibration amplitude a, and a size d of the light receiving face of the light receiver 21. The calculated light-receivable time is the period Td in which the light receiver 21 can acquire the scanning signal SS when the probe unit 1 resonates. The natural frequency fn of the probe unit 1 may be experimentally acquired in advance or may be acquired on the basis of a shape, a weight, a material, and the like of the probe unit 1 in advance.

The scanning time setter 222 determines a time that is equal to or less than ½ the calculated period Td as a scanning time Ts. The reason for determining the scanning time Ts to be equal to or less than ½ the period Td is that, when such setting is performed, the light receiver 21 can detect at least one complete scanning signal SS corresponding to a single scan regardless of a relative relation between a timing at which it arrives at the period Td and a timing of the wavelength scanning.

The scanning time Ts may be a time of a degree in which all scanning signals SS corresponding to two to three scans per period Td can be acquired. The scanning time setter 222 outputs a determined scanning time Ts to the wavelength controller 223.

Figure 4:
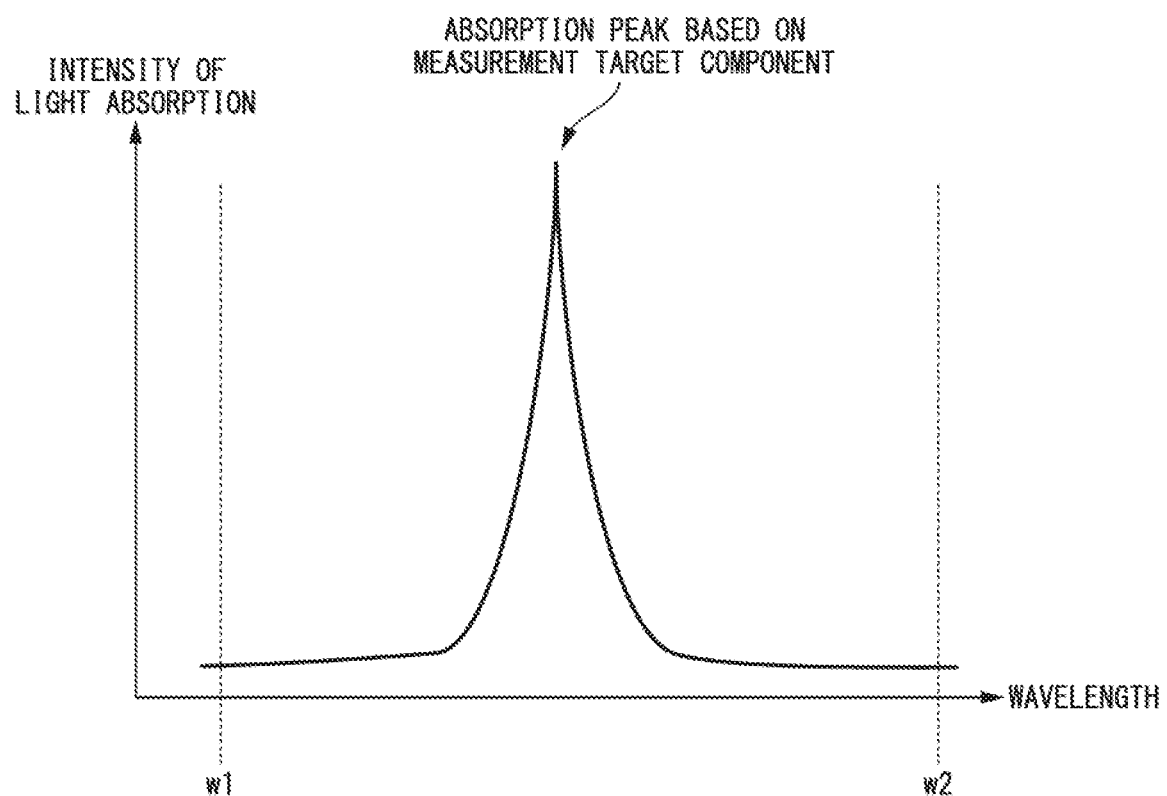
FIG. 4 is a diagram illustrating an image of wavelength scanning.

The wavelength controller 223 controls a laser drive signal for the laser driver 224 such that wavelength scanning is executed in accordance with the scanning time Ts determined by the scanning time setter 222. The laser drive signal is a signal used for controlling the wavelength of the laser light L1 emitted from the laser light source 20. At this time, the wavelength controller 223, as illustrated in FIG. 4, executes wavelength control of the light emission wavelength of the laser light L1 to be continuously changed from the wavelength w1 to the wavelength w2 such that the wavelength of the absorption peak for which an absorption spectrum is acquired is interposed therebetween. FIG. 4 is a diagram illustrating an image of the wavelength scanning. In FIG. 4, the vertical axis represents the intensity of light absorption, and the horizontal axis represents the wavelength. The wavelength controller 223 outputs the generated laser drive signal to the laser driver 224. For each measurement target component, an absorption peak that is a target is set in advance. The wavelength controller 223 causes the laser light source 20 to repeatedly execute wavelength scanning several thousands of times per measurement.

Figure 5:
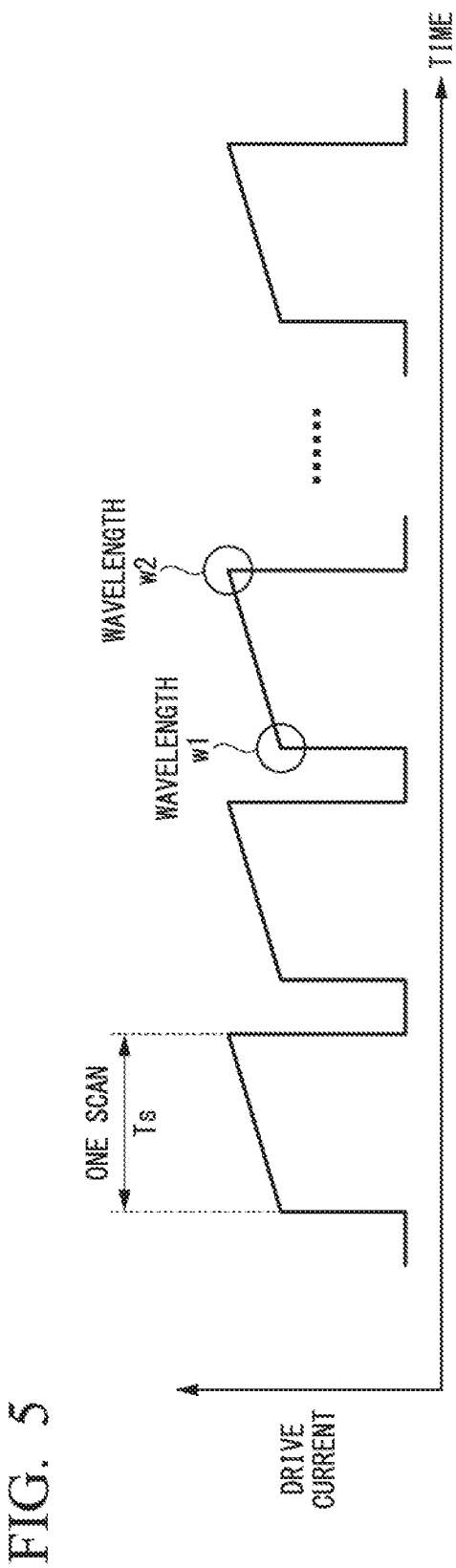
FIG. 5 is a diagram illustrating an image of a laser driving current.

The laser driver 224 generates a laser drive current corresponding to an input laser drive signal and outputs the generated laser drive current to the laser light source 20. The laser driver 224 outputs the laser drive current to the laser light source 20 during the scanning time Ts. FIG. 5 is a diagram illustrating an image of a laser drive current. In FIG. 5, the vertical axis represents the drive current, and the horizontal axis represents the time. In this way, the laser light L1 is emitted from the laser light source 20 of which wavelength is continuously changed in the range of the wavelength w1 to the wavelength w2 such that the wavelength of the absorption peak is interposed therebetween.

The calculator 225 calculates a density of a measurement target component contained in the measurement gas on the basis of a series of scanning signals SS that have been input. More specifically, first, the calculator 225 executes a pre-process of removing a scanning signal SS that is not appropriate for density calculation among the series of scanning signals SS that have been input. Here, a scanning signal that is not appropriate for density calculation, for example, is a signal in which a part of the signal in a single scan is missing. Next, the calculator 225 integrates the acquired scanning signals SS for removing noise. Next, the calculator 225 acquires an average signal of the integrated scanning signals SS. Hereinafter, the average signal of the integrated scanning signals SS will be described as an integrated average signal. Thereafter, the calculator 225 calculates a density of the measurement target component using a known density conversion technique such as a peak height method, a spectrum area method, or a 2f method on the basis of the integrated average signal. The calculator 225 outputs a result of the calculation of the density to the display controller 226.

The display controller 226 controls the display of the display 227 by controlling the display 227. For example, the display controller 226 causes the display 227 to display a result of density calculation.

The display 227 is a display device such as a liquid crystal display or an organic electroluminescence (EL) display and is integrated with the operation unit 221 as a touch panel. The display 227 executes display in accordance with control of the display controller 226. For example, the display 227 displays a density value of a measurement target component that is a result of density calculation. The display 227 and the operation unit 221 may be separate units connected to the gas density measuring device 10 through communication.

Figure 6:
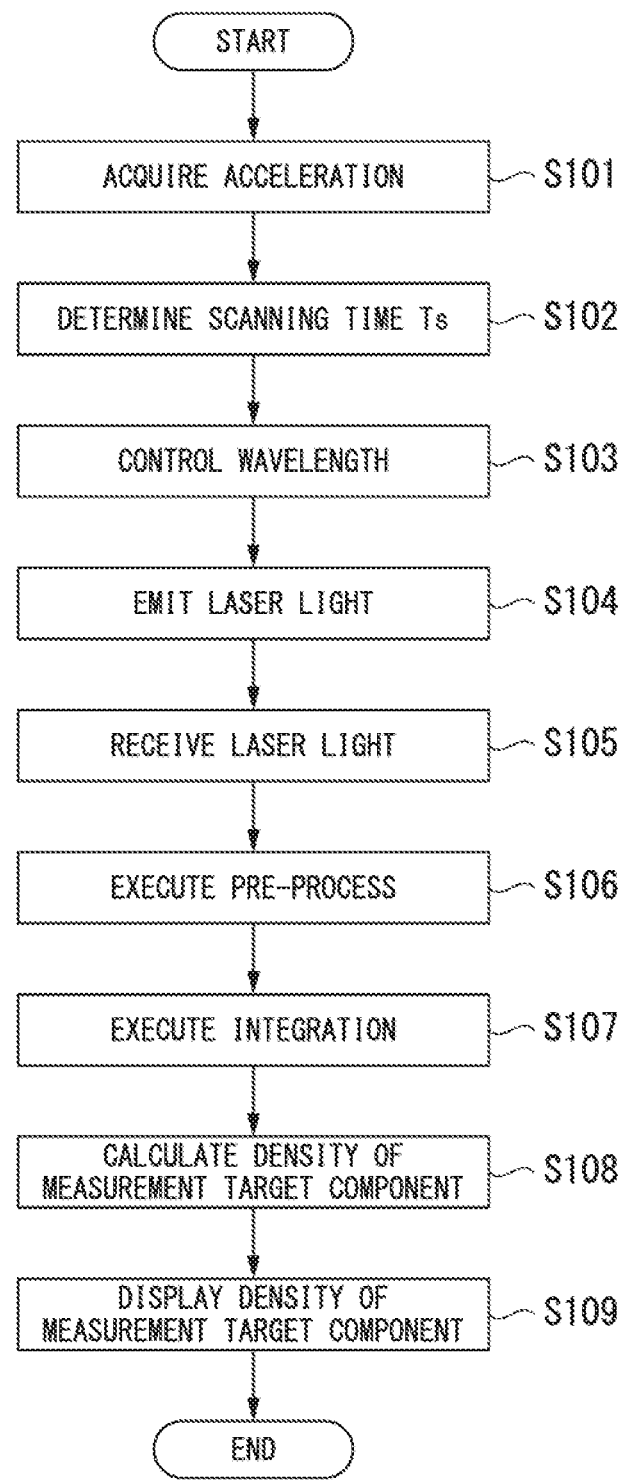
FIG. 6 is a flowchart illustrating the flow of a process of the gas density measuring device according to the first embodiment.

FIG. 6 is a flowchart illustrating the process of the gas density measuring device 10 according to the first embodiment.

The acceleration sensor 5 acquires an acceleration of the vibration of the probe unit 1 (Step S101). The acceleration sensor 5 outputs information of the acquired acceleration to the controller 22. The scanning time setter 222 acquires the information of the acceleration output from the acceleration sensor 5. The scanning time setter 222 determines a scanning time Ts on the basis of the acquired information of the acceleration (Step S102). More specifically, first, the scanning time setter 222 calculates a period Td on the basis of the following Equation 1 using the vibration amplitude a of the probe acquired on the basis of the acceleration, the natural frequency fn of the probe, and the size d of the light receiving face of the light receiver 21. In Equation 1, ω denotes an angular speed of the natural frequency of the probe, and ω can be defined as ω=2πfn.

$$Td = \frac{2}{\omega}\sin^{-1}\left(\frac{d}{a}\right) \qquad (1)$$

Then, the scanning time setter 222 determines a time that is equal to or less than ½ of the period Td acquired using Equation 1 described above as the scanning time Ts. The scanning time setter 222 outputs the determined scanning time Ts to the wavelength controller 223.

The wavelength controller 223 performs control of the wavelength in accordance with the scanning time Ts determined by the scanning time setter 222 (Step S103). More specifically, the wavelength controller 223 controls a laser drive signal for the laser driver 224 such that wavelength scanning is executed in accordance with the scanning time Ts determined by the scanning time setter 222. The laser driver 224 generates a laser drive current corresponding to the input laser drive signal and outputs the generated laser drive current to the laser light source 20.

The laser light source 20 emits laser light L1 using the laser drive current output from the laser driver 224 (Step S104).

The light receiver 21 receives laser light L2 reflected by the reflector 12 (Step S105). The light receiver 21 outputs an optical intensity of the received laser light L2 to the calculator 225 as a series of scanning signals SS. The calculator 225 performs a pre-process of removing a scanning signal SS that is not appropriate for density calculation among a series of input scanning signals SS (Step S106). The calculator 225 integrates the scanning signals SS after the pre-process (Step S107). Thereafter, the calculator 225 acquires an integrated average signal using the integrated scanning signal SS. The calculator 225 executes calculation of a density of a measurement target component on the basis of the integrated average signal that has been integrated (Step S108). The calculator 225 outputs a result of the density calculation to the display controller 226. The display controller 226 displays a result of the density calculation on the display 227 (Step S109).

Figure 7:
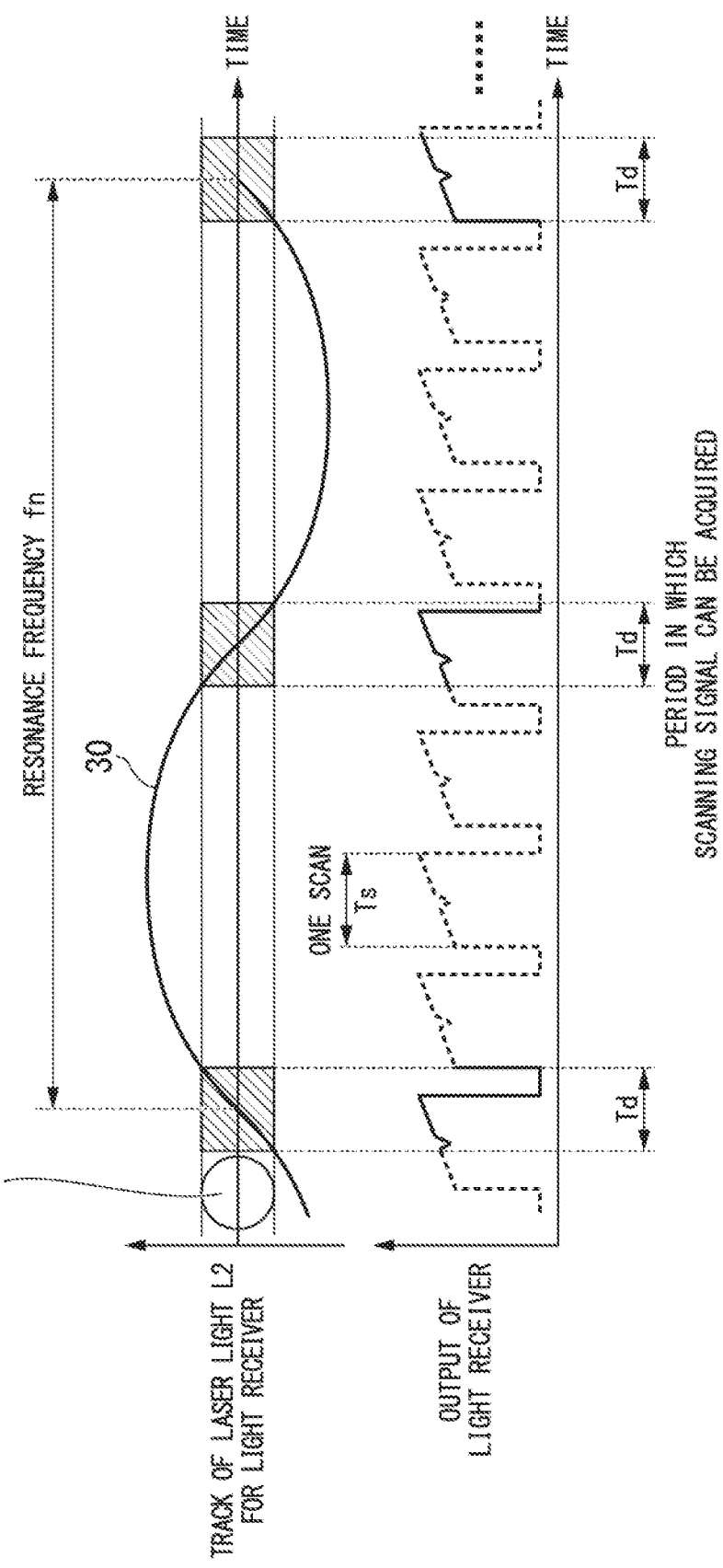
FIG. 7 is a diagram illustrating a conventional configuration.
Figure 8:
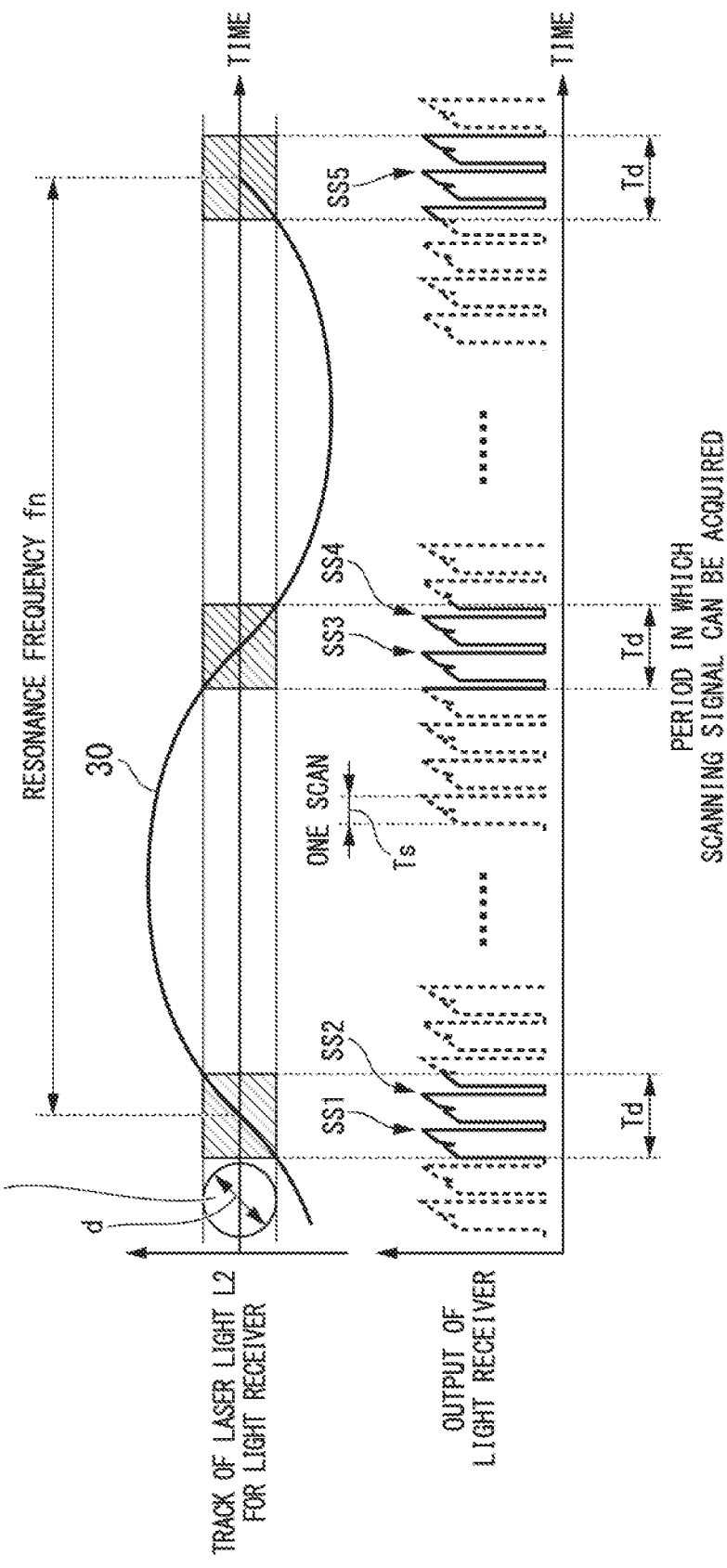
FIG. 8 is a diagram illustrating a solving method according to the present invention.

Next, a conventional configuration and a solving method according to the present invention will be described with reference to FIGS. 7 and 8. FIG. 7 is a diagram illustrating the conventional configuration. FIG. 8 is a diagram illustrating a solving method according to the present invention. First, description will be presented with reference to FIG. 7. In FIGS. 7 and 8, waveforms denoted using broken lines represent waveforms not received by the light receiver.

When the probe unit 1 resonates (resonance frequency=natural frequency fn of the probe unit 1), a period Td in which the scanning signal SS can be acquired is limited to a timing at which a relative position between the laser light source and the light receiver and the reflector becomes a positional relation in which the laser light L1 is reflected by the reflector, and the laser light L2 that is reflected light thereof can return to the light receiver.

When the length of the period Td is shorter than the scanning time Ts, the light receiver cannot perceive scanning signals SS corresponding to a single scan. Also when the length of the period Td is longer than the scanning time Ts, depending on a relation between the period Td and the scanning timing, a part of the scanning time Ts becomes out of the period Td, and the light receiver cannot perceive scanning signals SS corresponding to a single scan. When a complete scanning signal corresponding to a single scan cannot be acquired, it cannot be used for density calculation, and accordingly, a density of a measurement target component cannot be calculated.

Next, the present invention will be described with reference to FIG. 8. In FIG. 8, scanning signals SS1 to SS5 represent wavelength scanning in which a complete scanning signal corresponding to a single scan is acquired. As illustrated in FIG. 8, by determining the scanning time Ts to be equal to or less than ½ of the period Td using the scanning time setter 222, at least one complete scanning signal SS is acquired by the light receiver 21 when it arrives at the period Td. By acquiring a complete scanning signal corresponding to a single scan, the density of a measurement target component can be calculated.

According to the gas density measuring device 10 configured as described above, the scanning time Ts is determined to be equal to or less than ½ of the period Td on the basis of an acceleration acquired according to the vibration of the probe unit 1. For this reason, the light receiver 21 can detect at least one complete scanning signal SS corresponding to a single scan. In this way, even when a relative position of the reflector 12 with respect to the laser light source 20 and the light receiver 21 changes in accordance with a vibration of the probe unit 1, a complete scanning signal SS can be acquired, and accordingly, a density of a measurement target component can be measured.

Modified Example of First Embodiment

The acceleration sensor 5 is mounted at a tip end of the probe unit 1, whereby an output of the acceleration is acquired to be the highest. However, the mounting position of the acceleration sensor 5 is not limited to the tip end of the probe unit 1 and may be mounted at any other portion of the probe unit 1. For example, the acceleration sensor 5 may be mounted near the opening portion 11, a portion closed to the wall 4 of the flue of the probe unit 1, or the inside of the probe unit 1 (for example, near the reflector 12). For example, when the acceleration sensor 5 is mounted at a portion close to the wall 4 of the flue of the probe unit 1, it is close to a fixed end of a vibration, and accordingly, the output of the acceleration decreases as that much. However, it can be responded by executing correction calculation of a decrease in the output.

Second Embodiment

A second embodiment is an embodiment in which a gas density measuring device acquires a period Td without including an acceleration sensor.

Figure 9:
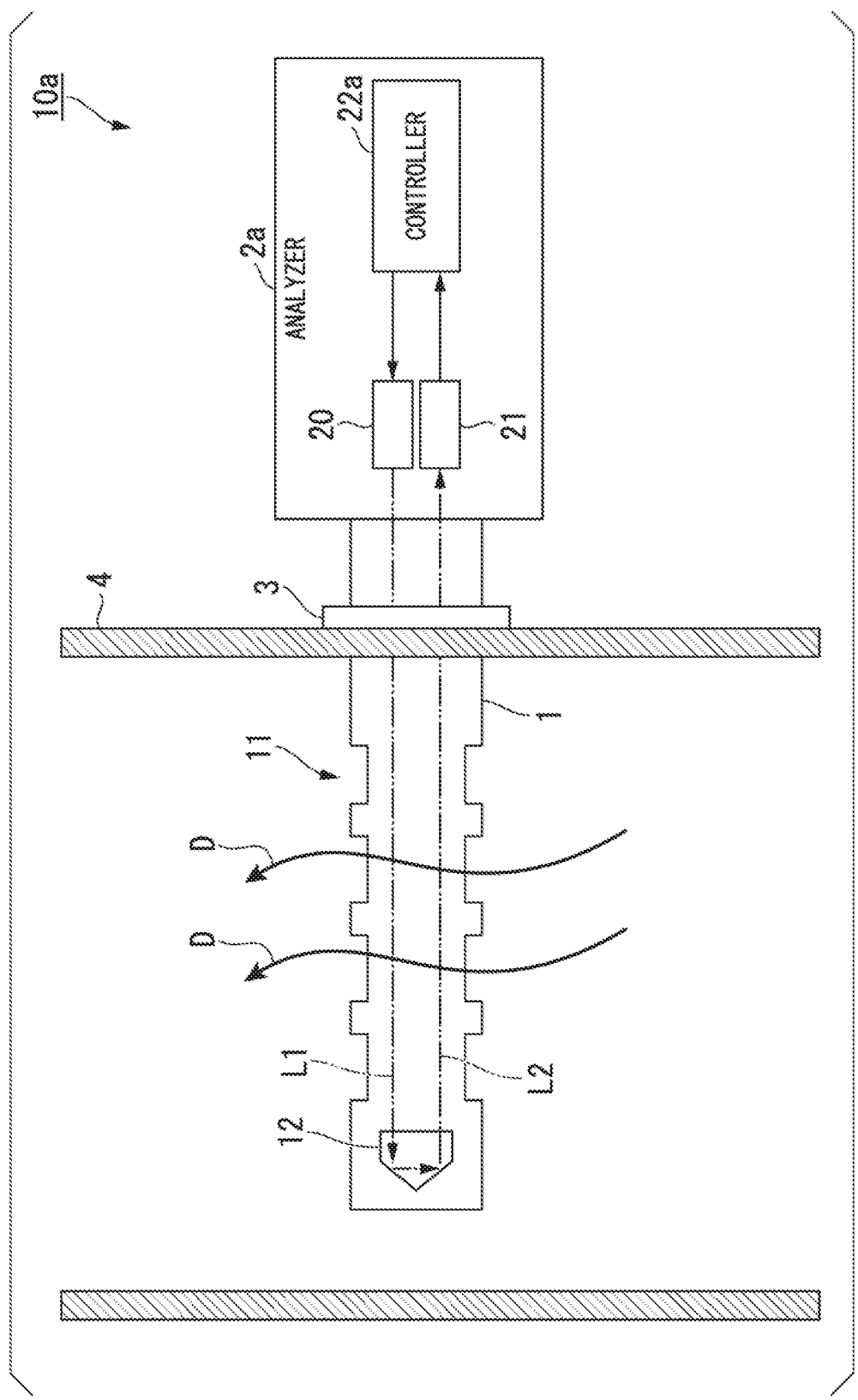
FIG. 9 is diagram illustrating the configuration of a gas density measuring device according to a second embodiment.

FIG. 9 is a diagram illustrating the configuration of a gas density measuring device 10a according to the second embodiment. The gas density measuring device 10a has a configuration different from that of the gas density measuring device 10 in that an analyzer 2a is included instead of the analyzer 2, and the acceleration sensor 5 is not included. The other components of the gas density measuring device 10a are similar to those of the gas density measuring device 10. For this reason, description of the entire gas density measuring device 10a will be omitted, and the configuration of the analyzer 2a will be described.

The analyzer 2a is mounted at an end portion of the probe unit 1 on a side opposite to an end portion at which a reflector 12 is disposed and is positioned outside a flue. The analyzer 2a includes a laser light source 20, a light receiver 21, and a controller 22a. The laser light source 20 and the light receiver 21 execute processes similar to those of the functional units having the same names according to the first embodiment, and thus description thereof will not be presented here.

The controller 22a executes an analysis of a measurement target fluid using a result of light reception acquired by the light receiver 21 and control of the laser light source 20. The controller 22a controls a laser light output of the laser light source 20 such that a scanning time Ts is equal to or shorter than the light-receivable time. The scanning time Ts is a time it takes to scan the wavelength of laser light L1 emitted from the laser light source 20 in a certain wavelength range (from a wavelength w1 to a wavelength w2). The light-receivable time is a time in which the laser light L2 reflected by the reflector 12 can be received by the light receiver 21. More specifically, the controller 22a adjusts the scanning time Ts by controlling the laser light source 20 in accordance with presence/absence of detection of an integrated average signal that is an average of the result of integration acquired by integrating the result of light reception acquired by the light receiver 21. Detection of an integrated average signal being present represents acquiring a signal of a waveform similar to a complete scanning signal SS as a result of averaging a result of integration of scanning signals SS. On the other hand, detection of an integrated average signal being absent represents not acquiring a signal of a waveform similar to a complete scanning signal SS as the result described above. "Being similar" described above represents that the waveform of the result acquired by averaging the result of integration of scanning signals SS and the waveform of the complete scanning signal SS coincide with each other a predetermined ratio or more. The controller 22a gradually shortens the scanning time Ts until an integrated average signal is detected.

Figure 10:
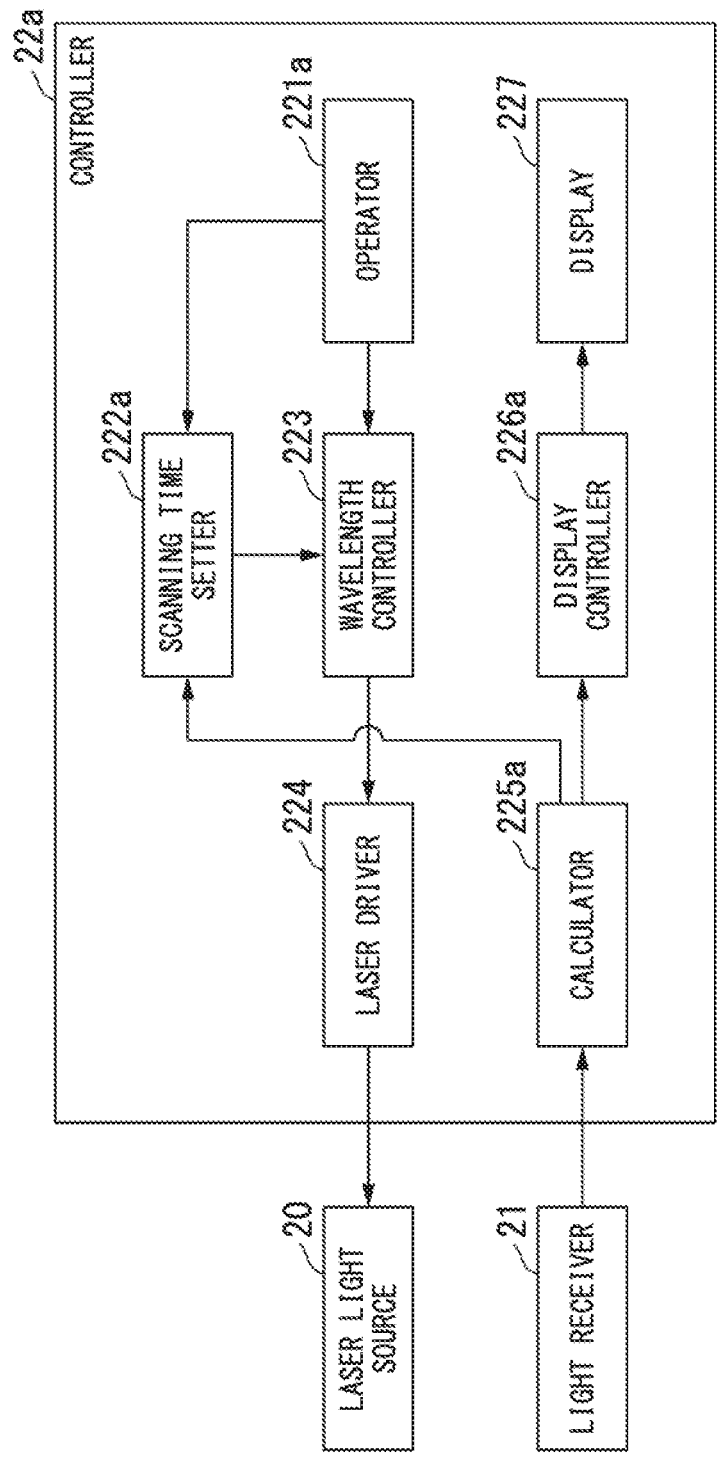
FIG. 10 is a block diagram illustrating the configuration of a controller according to the second embodiment.

FIG. 10 is a block diagram illustrating the configuration of the controller 22a according to the second embodiment. The controller 22a includes an operation unit 221a, a scanning time setter 222a, a wavelength controller 223, a laser driver 224, a calculator 225a, a display controller 226a, and a display 227. The controller 22a includes an operation unit 221a, a scanning time setter 222a, a calculator 225a, and a display controller 226a instead of the operation unit 221, the scanning time setter 222, the calculator 225, and the display controller 226, which is different from the configuration of the controller 22. The other components of the controller 22a is similar to those of the controller 22. For this reason, description of the entire controller 22a will not be presented, and the configurations of the operation unit 221a, the scanning time setter 222a, the calculator 225a, and the display controller 226a will be described.

The operation unit 221a receives inputs of instructions for various settings of the gas density measuring device 10a (for example, a measurement gas type, a density range, and the like) of the gas density measuring device 10a, a measurement start instruction, a measurement end instruction, and the scanning time Ts from a user. An instruction for the scanning time Ts, for example, is an instruction indicating changing of the scanning time Ts. In the instruction for the scanning time Ts, for example, information of the scanning time Ts to be set gain is included. Information of a scanning time Ts shorter than the scanning time Ts that is currently set may be included in an instruction for the scanning time Ts.

The scanning time setter 222a determines the scanning time Ts on the basis of an instruction for the scanning time Ts input from the operation unit 221a.

The calculator 225a calculates a density of a measurement target component contained in the measurement gas on the basis of a series of scanning signals SS that have been input. More specifically, first, the calculator 225a executes a pre-process of removing a scanning signal SS that is not appropriate for density calculation among a series of scanning signals SS that have been input. Next, the calculator 225a integrates the scanning signals SS that have been acquired for removing noise. Next, the calculator 225a determines whether or not an integrated average signal has been detected by taking an average using the integrated scanning signals SS.

When a scanning time Ts is not appropriate, there is a high possibility that a complete scanning signal SS corresponding to a single scan cannot be acquired by the light receiver 21, and accordingly, there is a possibility that the calculator 225a cannot detect an integrated average signal. On the other hand, when the scanning time Ts is appropriate, there is a high possibility that a complete scanning signal SS corresponding to a single scan can be acquired by the light receiver 21, and accordingly, there is a high possibility that an integrated average signal can be detected by the calculator 225a. A case in which the scanning time Ts is not appropriate, for example, is a case in which the scanning time Ts is the same as the period Td or longer than the period Td. Particularly, when the scanning time Ts is not appropriate, when acquired scanning signals SS are integrated, and an average thereof is taken, the signal is mixed with noise, and accordingly, an integrated average signal cannot be detected by the calculator 225a.

When an integrated average signal has been detected, the calculator 225a notifies the scanning time setter 222a of the successful detection. On the other hand, when an integrated average signal cannot be detected, the calculator 225a notifies the display controller 226a of an indication representing error.

Figure 11:
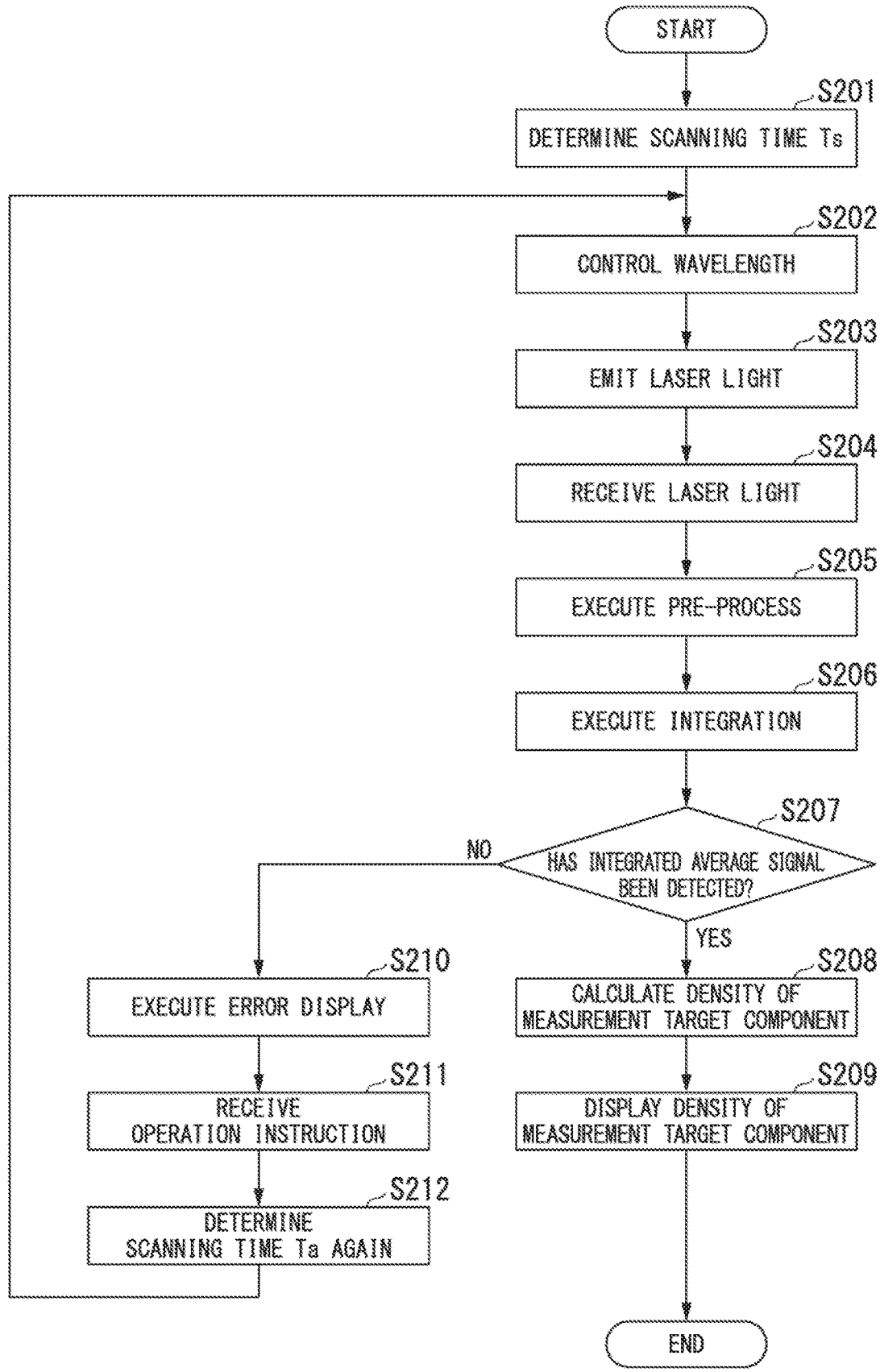
FIG. 11 is a flowchart illustrating the flow of a process of the gas density measuring device according to the second embodiment.
Figure 12:
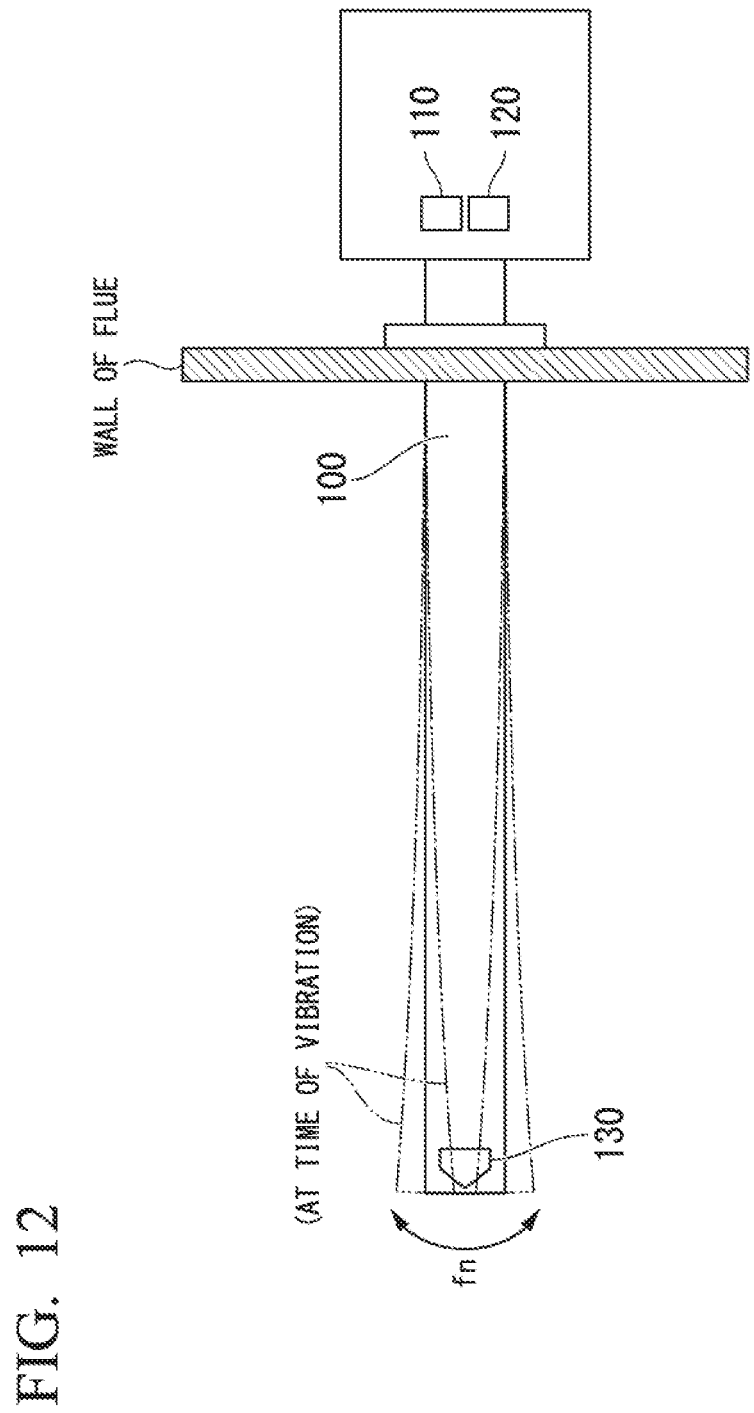
FIG. 12 is a diagram illustrating an appearance of a probe at the time of resonance.

The display controller 226a controls the display of the display 227 by controlling the display 227. For example, the display controller 226a causes the display 227 to display an indication representing error or a result of density calculation. FIG. 11 is a flowchart illustrating the flow of a process of the gas density measuring device 10a according to the second embodiment.

The scanning time setter 222a determines a scanning time Ts (Step S101).

For example, the scanning time setter 222a may determine a time set as the scanning time in advance as the scanning time Ts and may determine a time input from the operation unit 221a as the scanning time Ts. The scanning time setter 222a outputs the determined scanning time Ts to the wavelength controller 223.

The wavelength controller 223 executes wavelength control based on the scanning time Ts determined by the scanning time setter 222a (Step S202). More specifically, the wavelength controller 223 executes control of a laser drive signal for the laser driver 224 such that wavelength scanning is executed in accordance with the scanning time Ts determined by the scanning time setter 222a. The laser driver 224 generates a laser drive current corresponding to an input laser drive signal and outputs the generated laser drive current to the laser light source 20.

The laser light source 20 emits laser light L1 using the laser drive current output from the laser driver 224 (Step S203).

The light receiver 21 receives laser light L2 reflected by the reflector 12 (Step S204). The light receiver 21 outputs an optical intensity of the received laser light L2 to the calculator 225a as a series of scanning signals SS. The calculator 225a executes a pre-process of removing a scanning signal SS that is not appropriate for density calculation among the series of scanning signals SS that have been input (Step S205).

The calculator 225a integrates scanning signals SS after the pre-process (Step S206). Thereafter, the calculator 225a determines whether or not an integrated average signal has been detected using the integrated scanning signal SS (Step S207). For example, the calculator 225a determines that an integrated average signal has been detected when a signal having a waveform similar to that of a complete scanning signal SS has been acquired as a result of averaging the integrated scanning signal SS.

When the integrated average signal has been detected (Step S207—Yes), the calculator 225a executes the calculation of a density of a measurement target component on the basis of the detected integrated average signal (Step S208).

The calculator 225a outputs a result of the density of a calculation to the display controller 226a. The display controller 226a displays the result of the calculation of a density on the display 227 (Step S209).

On the other hand, when the integrated average signal has not been detected (No in Step S207), the calculator 225a notifies the display controller 226a of an error. The display controller 226a controls the display 227 to display the error in accordance with the notification from the calculator 225a (Step S210). Thereafter, the gas density measuring device 10a receives an instruction for the scanning time Ts from the outside (Step S211). When the instruction for the scanning time Ts is input through the operation unit 221a, the scanning time setter 222a determines the scanning time Ts again on the basis of the instruction for the scanning time Ts that has been input (Step S212). For example, the scanning time setter 222a determines a scanning time Ts (for example, a scanning time Ts shorter than the scanning time Ts that is currently set) included in the instruction for the scanning time Ts as a scanning time Ts to be newly set. Thereafter, processes of Step S202 and subsequent steps are executed. In this way, the gas density measuring device 10a gradually shortens the scanning time Ts until the integrated average signal is detected.

According to the gas density measuring device 10a configured as described above, a scanning time Ts is determined using the waveform of the scanning signal SS without using an acceleration. More specifically, the gas density measuring device 10a adjusts the scanning time Ts by controlling the laser light source 20 in accordance with the presence/absence of detection of an integrated average signal acquired on the basis of a result of reception acquired by the light receiver 21. In this way, when the scanning time Ts is determined using the waveform of the scanning signal SS, calculation using an acceleration is not necessary.

Accordingly, the acceleration sensor 5 is not required. Particularly, there are many cases in which the flue in which the probe unit 1 is inserted is in a high-temperature (several hundreds of ° C.) environment, and thus, the number of components disposed inside the flue may be small. In addition, the gas density measuring device 10a adjusts the scanning time Ts in accordance with the presence/absence of detection of an integrated average signal, and accordingly, the adjustment can be executed with a result of detection acquired by the light receiver 21 reflected in the scanning time Ts. Accordingly, through repeated execution, the light receiver 21 can detect at least one complete scanning signal SS corresponding to a single scan. For this reason, the cost can be inhibited more than that according to the first embodiment, and a complete scanning signal SS can be acquired even when a relative position of the reflector 12 with respect to the laser light source 20 and the light receiver 21 changes in accordance with a vibration of the probe unit 1, whereby the density of a measurement target component can be measured.

The gas density measuring device 10a gradually shortens the scanning time Ts until an integrated average signal is detected. Accordingly, through repeated execution, the light receiver 21 can detect at least one complete scanning signal SS corresponding to a single scan. For this reason, even when a relative position of the reflector 12 with respect to the laser light source 20 and the light receiver 21 changes in accordance with a vibration of the probe unit 1, a complete scanning signal SS can be acquired, whereby the density of a measurement target component can be measured.

Modified Example of Second Embodiment

The scanning time setter 222a may be configured to set the scanning time Ts as being shortened at predetermined intervals when an instruction for the scanning time Ts is input.

Modified Example Common to the First Embodiment and Second Embodiment

The reflector 12 is not limited to the corner-cube prism and may be any object as long as it is a polyhedron that can reflect laser light emitted from the laser light source 20 to the light receiver 21.

The calculators 225 and 225a may be configured to integrate all the scanning signals SS output from the light receiver 21 without executing the pre-process.

The scanning time setter 222 and the scanning time setter 222a may be configured to change the scanning time Ts in accordance with a degree of light absorption of a measurement target component. The degree of light absorption changes in accordance with a type, a density, a temperature, and a pressure of a measurement target component. When the degree of light absorption of the measurement target component is equal to or more than a predetermined threshold, the number of scanning signals SS required for calculating the density of the measurement target component may be relatively small. For this reason, the scanning time setter 222 and the scanning time setter 222a set the scanning time Ts to a value close to a period $Td \times \frac{1}{2}$ such that at least one complete scanning signal SS can be acquired within the period Td.

On the other hand, when the degree of light absorption of the measurement target component is less than the predetermined threshold, the number of scanning signals SS required for calculating the density of the measurement target component is relatively large. For this reason, the scanning time setter 222 and the scanning time setter 222a may set the scanning time Ts to a smaller value such that a plurality of complete scanning signals SS can be acquired within the period Td.

By configuring as described above, an appropriate scanning time can be set in accordance with the degree of light absorption of the measurement target component. In this way, a necessary scanning signal SS can be acquired within the period Td more reliably. For this reason, even when a relative position of the reflector 12 with respect to the laser light source 20 and the light receiver 21 changes in accordance with a vibration of the probe unit 1, a complete scanning signal SS can be acquired, and accordingly, the density of the measurement target component can be measured.

The present invention is not limited to the gas density measuring device that measures the density of a measurement target gas and can be also applied to a spectroscopic analysis apparatus that analyzes light absorption characteristics of a fluid.

As above, while the embodiments of the present invention have been described in detail with reference to the drawings, a specific configuration is not limited to these embodiments and includes a design and the like in a range not departing from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

A part or all of the controller 22, 22a of the spectroscopic analysis apparatus in the above-described embodiment may be implemented by a computer. In this case, a control function thereof may be implemented by recording a part or all of a program for implementing the control function on a computer-readable storage medium and causing a computer system to read and execute the program recorded on the storage medium.

The "computer system" described here is assumed to be a computer system embedded in the controller 22, 22a and include an operating system (OS) and hardware such as peripheral devices. The "computer-readable storage medium" refers to a storage device including a flexible disk, a magneto-optical disc, a read only memory (ROM), a portable medium such as a compact disc (CD)-ROM, and a hard disk embedded in the computer system.

Further, the "computer-readable storage medium" is assumed to include a computer-readable storage medium for dynamically holding a program for a short time as in a communication line when the program is transmitted via a network such as the Internet or a communication line such as a telephone line and a computer-readable storage medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system.

A part or all of the controller 22, 22a in the above-described embodiment may be implemented as an integrated circuit such as large scale integration (LSI). Each of the functional blocks of the controller 22, 22a may be individually formed as a processor or a part or all thereof may be integrated into a processor. A method of forming an integrated circuit is not limited to LSI, and may be implemented by a dedicated circuit or a general-purpose processor. When the technology of an integrated circuit with which LSI is replaced emerges with the advancement of semiconductor technology, the integrated circuit based on the technology may be used.

What is claimed is:

1. A spectroscopic analysis apparatus comprising:
   a laser light source that emits laser light, of which wavelength changes, toward a reflector inside a probe, the probe being configured to be disposed in a flow passage of a measurement target fluid;
   a light receiver that receives the laser light reflected by the reflector;
   a controller that analyzes the measurement target fluid using a result of reception acquired by the light receiver, the controller being configured to control the laser light source; and
   an acceleration sensor that detects an acceleration of a vibration of the probe,
   wherein the controller controls the laser light source to perform at least one scan of the laser light, the controller
     calculates a light-receivable time of the laser light, the light-receivable time being a time in which the laser light reflected by the reflector can be received by the light receiver, the calculation being made by using a result of detection acquired by the acceleration sensor, and
     controls an output of the laser light of the laser light source such that a scanning time of the laser light is equal to or shorter than half the light-receivable time, the scanning time being a time to scan the laser light emitted from the laser light source in a certain wavelength range.

2. The spectroscopic analysis apparatus according to claim 1, wherein the scanning time is a time it takes to scan a light emission wavelength of the laser light emitted from the laser light source over a wavelength range including a wavelength of an absorption peak for which an absorption spectrum of the measurement target fluid is acquired.

3. The spectroscopic analysis apparatus according to claim 1, wherein the controller sets the scanning time so that at least one complete scanning signal can be obtained from the result of reception acquired by the light receiver.

4. The spectroscopic analysis apparatus according to claim 1, wherein the acceleration sensor is mounted on a distal end of the probe.

5. The spectroscopic analysis apparatus according to claim 1, wherein the analyzing the measurement target fluid includes deriving a density of a measurement target component in the measurement target fluid by measuring an absorption spectrum of the measurement target fluid.

6. The spectroscopic analysis apparatus according to claim 5, wherein the laser light source emits laser light of which wavelength changes within a range including a peak of the absorption spectrum of the measurement target fluid.

7. A spectroscopic analysis apparatus comprising:
   a laser light source that emits laser light, of which wavelength changes, toward a reflector inside a probe, the probe being configured to be disposed in a flow passage of a measurement target fluid;
   a light receiver that receives the laser light reflected by the reflector; and
   a controller that analyzes the measurement target fluid using a result of reception acquired by the light receiver, the controller being configured to control the laser light source,
   wherein the controller controls the laser light source to perform at least one scan of the laser light, the controller controlling the laser light source such that a scanning time of the laser light is equal to or shorter than a light-receivable time of the laser, the scanning time being a time to scan the laser light emitted from the laser light source in a certain wavelength range, the light-receivable time being a time in which the laser light reflected by the reflector can be received by the light receiver,
   wherein the controller causes the laser light source to perform scanning a plurality of times and causes the light receiver to receive a plurality of scanning signals corresponding thereto, and
   the controller removes a scanning signal not appropriate for the analysis from the result of reception acquired by the light receiver including the plurality of scanning signals.

8. The spectroscopic analysis apparatus according to claim 7, wherein the controller integrates the plurality of scanning signals from which the scanning signal not appropriate for the analysis has been removed, derives an average of the integrated scanning signals to acquire an integrated average scanning signal, and analyzes the measurement target fluid on the basis of the acquired integrated average scanning signal.

9. The spectroscopic analysis apparatus according to claim 5, wherein the controller derives the density of the measurement target component in the measurement target fluid in accordance with a density conversion technique including at least one of a peak height method, a spectrum area method, and a 2f method.

10. The spectroscopic analysis apparatus according to claim 1, wherein the controller calculates a vibration amplitude of the probe using the result of detection acquired by the acceleration sensor and calculates the light-receivable time on the basis of the calculated vibration amplitude, a vibration frequency of the probe, and a size of a light receiving face of the light receiver.

11. The spectroscopic analysis apparatus according to claim 10, wherein the vibration frequency of the probe is a natural frequency acquired in advance.

12. The spectroscopic analysis apparatus according to claim wherein the controller derives a vibration amplitude of the probe on the basis of the acceleration of vibration of the probe detected by the acceleration sensor, and the controller derives the emission period which is denoted as Td in Expression (1) below, where the vibration amplitude of the probe is denoted as a, a natural frequency of the probe is denoted as fn, a size of a light receiving face of the light receiver is denoted as d, $$Td = \frac{2}{\omega}\sin^{-1}\left(\frac{d}{a}\right), \quad (1)$$

in which ω denotes an angular speed of the natural frequency of the probe, and ω=2πfn holds.

13. The spectroscopic analysis apparatus according to claim 1, wherein the controller adjusts the scanning time by controlling the laser light source in accordance with presence/absence of detection of an integrated average signal that is an average of a result of integration acquired by integrating the result of reception acquired by the light receiver.

14. The spectroscopic analysis apparatus according to claim 13, wherein the controller gradually shortens the scanning time until the integrated average signal is detected.

15. A spectroscopic analysis apparatus comprising:
a laser light source that emits laser light, of which wavelength changes, toward a reflector inside a probe, the probe being configured to be disposed in a flow passage of a measurement target fluid;
a light receiver that receives the laser light reflected by the reflector; and
a controller that analyzes the measurement target fluid using a result of reception acquired by the light receiver, the controller being configured to control the laser light source,
wherein the controller controls the laser light source to perform at least one scan of the laser light, the controller controlling the laser light source such that a scanning time of the laser light is equal to or shorter than a light-receivable time of the laser, the scanning time being a time to scan the laser light emitted from the laser light source in a certain wavelength range, the light-receivable time being a time in which the laser light reflected by the reflector can be received by the light receiver,
wherein the controller causes the laser light source to perform scanning a plurality of times, causes the light receiver to receive a plurality of scanning signals corresponding thereto, integrates the plurality of scanning signals, and derives an average of the integrated scanning signals to acquire an integrated average scanning signal, and
the controller gradually shortens the scanning time until the integrated average scanning signal coincides with a complete scanning signal with a predetermined ratio or more.

16. The spectroscopic analysis apparatus according to claim 15, further comprising:
an operation unit that receives an operation with respect to the scanning time,
wherein the controller shortens the scanning time every time the operation unit receives the operation.

17. The spectroscopic analysis apparatus according to claim 15, further comprising:
a display that performs display in accordance with control of the controller,
wherein, when the integrated average scanning signal does not coincide with a complete scanning signal with a predetermined ratio or more, the controller controls the display to display information indicating an error.

18. The spectroscopic analysis apparatus according to claim 1, wherein when a degree of light absorption of the measurement target fluid is equal to or more than a predetermined threshold, the controller sets the scanning time to a value close to half of the light-receivable time.

19. The spectroscopic analysis apparatus according to claim 1, wherein when a degree of light absorption of the measurement target fluid is less than a predetermined threshold, the controller sets the scanning time to be smaller than when the degree of light absorption of the measurement target fluid is equal to or more than the predetermined threshold.

* * * * *